United States Patent
Han et al.

(10) Patent No.: US 11,097,709 B2
(45) Date of Patent: Aug. 24, 2021

(54) BRAKE CYLINDER, BRAKE CLAMP UNIT AND RAIL VEHICLE

(71) Applicants: CRRC QISHUYAN INSTITUTE CO., LTD., Jiangsu (CN); CRRC CHANGZHOU TECH-MARK INDUSTRIAL CO., LTD., Jiangsu (CN)

(72) Inventors: Hongwen Han, Jiangsu (CN); Chunguang Bao, Jiangsu (CN); Junhua Zhu, Jiangsu (CN); Liqing Du, Jiangsu (CN); Qingbing Gou, Jiangsu (CN); Zhuomin Mei, Jiangsu (CN)

(73) Assignees: CRRC QISHUYAN INSTITUTE CO., LTD., Jiangsu (CN); CRRC CHANGZHOU TECH-MARK INDUSTRIAL CO., LTD., Jiangsu (CN)

( * ) Notice: Subject to any disclaimer, the term of this patent is extended or adjusted under 35 U.S.C. 154(b) by 147 days.

(21) Appl. No.: 16/469,856

(22) PCT Filed: Dec. 14, 2017

(86) PCT No.: PCT/CN2017/116228
§ 371 (c)(1),
(2) Date: Jun. 14, 2019

(87) PCT Pub. No.: WO2018/108131
PCT Pub. Date: Jun. 21, 2018

(65) Prior Publication Data
US 2019/0315331 A1 Oct. 17, 2019

(30) Foreign Application Priority Data

Dec. 15, 2016 (CN) .......................... 201611157415.5
Dec. 15, 2016 (CN) .......................... 201611157433.3

(Continued)

(51) Int. Cl.
*B60T 17/08* (2006.01)
*B60T 8/44* (2006.01)
(Continued)

(52) U.S. Cl.
CPC ................ *B60T 17/08* (2013.01); *B60T 8/44* (2013.01); *B60T 15/40* (2013.01); *B60T 17/221* (2013.01)

(58) Field of Classification Search
CPC .......... B60T 17/08; B60T 17/221; B60T 8/44; B60T 15/40
See application file for complete search history.

(56) References Cited

U.S. PATENT DOCUMENTS 3,401,775 A * 9/1968 Sobol ................. B61H 15/0057
188/196 D
3,589,477 A * 6/1971 Sander ............... B61H 15/0057
188/76

(Continued)

FOREIGN PATENT DOCUMENTS

CN 201283877 Y * 8/2009
CN 202732795 U * 2/2013

(Continued)

OTHER PUBLICATIONS

Translation of Chinese Patent No. CN 201283877 obtained from website: https://worldwide.espacenet.com on Jan. 6, 2021.*

(Continued)

*Primary Examiner* — Pamela Rodriguez
(74) *Attorney, Agent, or Firm* — Cantor Colburn LLP

(57) ABSTRACT

The present disclosure relates to a brake cylinder, a brake caliper unit and a rail vehicle. The brake cylinder includes a cylinder block and a cylinder head fixedly sleeved over one end of the cylinder block, the cylinder block being provided therein with a piston, a guide spring, a guide nut, a taper (Continued)

sleeve, an adjusting shaft assembly, a thrust sleeve and a gap adjusting nut assembly; wherein the gap adjusting nut assembly includes a gap adjusting nut, a gap adjusting sleeve and a gap adjusting spring, and a groove extending along an axial direction of the gap adjusting sleeve is formed on an outer circumferential surface of the gap adjusting sleeve, in which groove a release gap adjusting unit is provided. The thrust sleeve spring of the brake cylinder of the present disclosure can recognize excessive elastic deformation of the external lever to prevent the gap adjustment triggered by the excessive elastic deformation of the external lever, ensuring that the release gap of the disc is constant.

22 Claims, 9 Drawing Sheets

(30) Foreign Application Priority Data

Dec. 15, 2016 (CN) .......................... 201621374736.6
Dec. 15, 2016 (CN) .......................... 201621374785.X

(51) Int. Cl.
*B60T 15/40* (2006.01)
*B60T 17/22* (2006.01)

(56) References Cited

U.S. PATENT DOCUMENTS

| 4,771,869 A | * | 9/1988 | Harrison | ................ F16D 59/02 |
| | | | | 188/170 |
| 2011/0226568 A1 | * | 9/2011 | Elstorpff | ................ B60T 17/08 |
| | | | | 188/151 R |
| 2011/0266102 A1 | * | 11/2011 | Elstorpff | ................ B60T 17/08 |
| | | | | 188/196 V |

FOREIGN PATENT DOCUMENTS

| CN | 202732801 U | * | 2/2013 |
| CN | 106481701 A | * | 3/2017 |
| CN | 106641042 A | * | 5/2017 |
| CN | 206386424 U | * | 8/2017 |

OTHER PUBLICATIONS

Translation of Chinese Patent No. CN 202732795 obtained from website: https://worldwide.espacenet.com on Jan. 6, 2021.*
Translation of Chinese Patent No. CN 202732801 obtained from website: https://worldwide.espacenet.com on Jan. 6, 2021.*
Translation of Chinese Patent No. CN 206386424 obtained from website: https://worldwide.espacenet.com on Jan. 6, 2021.*

* cited by examiner

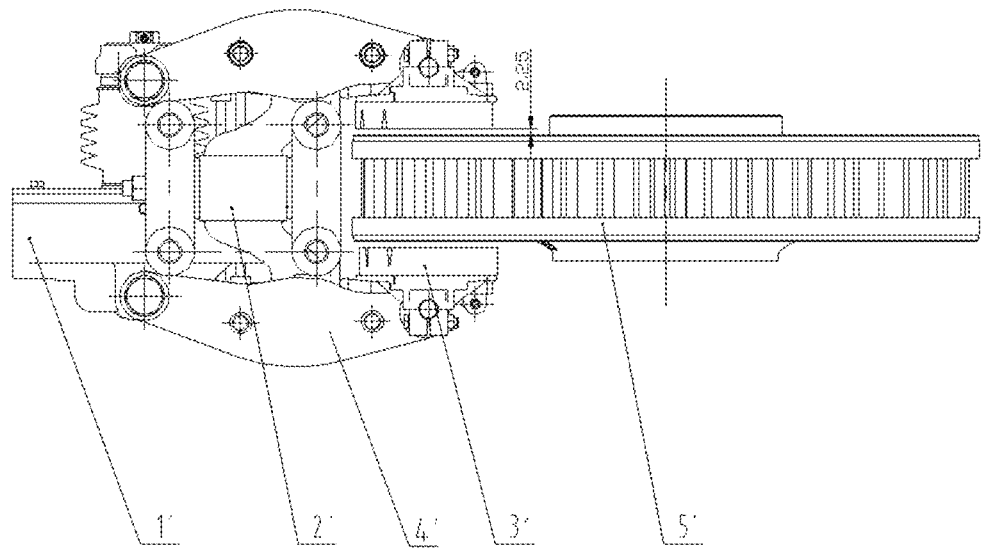
(prior art) FIG. 1
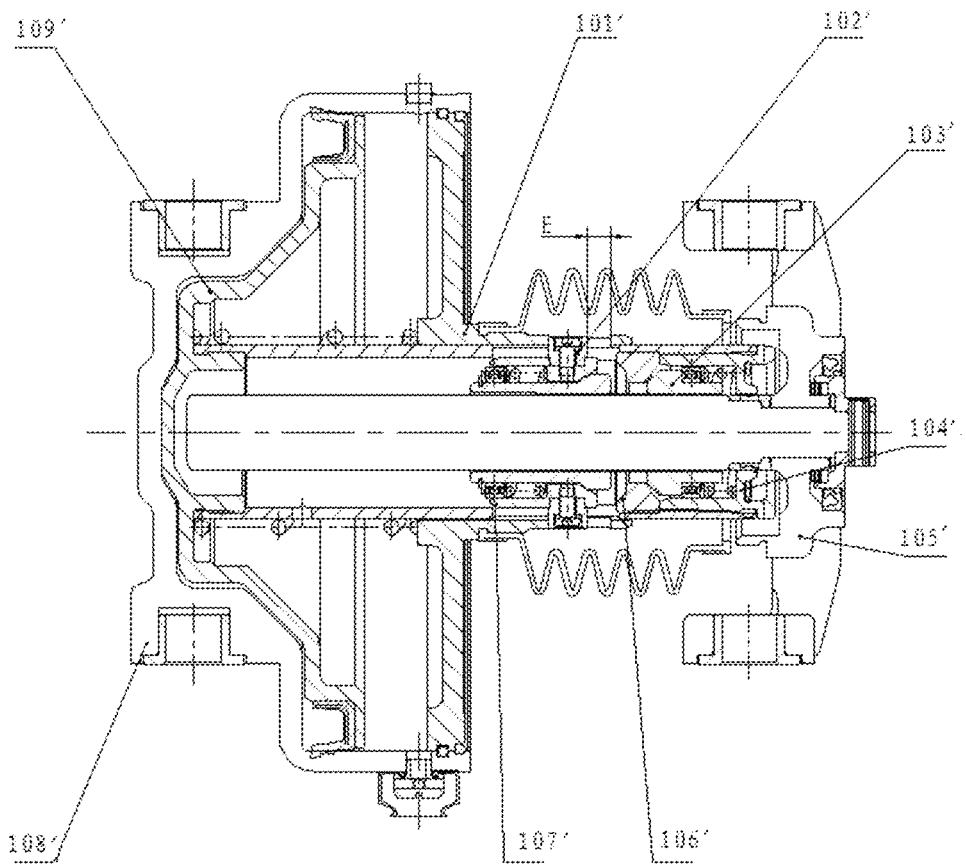
(prior art) FIG. 2

BRAKE CYLINDER, BRAKE CLAMP UNIT AND RAIL VEHICLE

CROSS REFERENCE TO RELATED APPLICATIONS

This is the U.S. national stage of application No. PCT/CN2017/116228, filed on Dec. 14, 2017. Priority under 35 U.S.C. § 119(a) and 35 U.S.C. § 365(b) is claimed from Chinese Application No. 201621374785.X, filed Dec. 15, 2016; Chinese Application No. 201621374736.6, filed Dec. 15, 2016, Chinese Application No. 201611157433.3, filed on Dec. 15, 2016 and Chinese Application No. 201611157415.5, filed on Dec. 15, 2016, the disclosures of which are incorporated herein by reference.

FIELD OF THE INVENTION

The present disclosure relates to a brake device, and in particular, to a brake cylinder that facilitates adjustment of a release gap, a brake caliper unit capable of recognizing deformation of a lever, and a rail vehicle having the brake caliper unit, which pertain to the technical field of vehicle braking system.

BACKGROUND OF THE INVENTION

Basic brake devices of existing rail vehicles mainly include a brake caliper unit, a brake disc and a brake pad. The brake caliper unit is one of the key parts of the brake system and is crucial for safe operation of the vehicle. The brake caliper unit is mainly composed of a brake cylinder and an external lever, etc.

During the actual braking process of the vehicle, a gap between the external lever and the brake cylinder of the brake caliper unit, a gap between a pin shaft and a brake pad carrier, a release gap between the brake disc and a brake pad, and elastic deformation of the external lever and the brake pad carrier all are considered as disc release gaps, and serve as the basis of gap adjustment made by a brake regulator. When the disc release gap exceeds a predetermined value, the brake regulator starts to automatically perform the gap adjustment to ensure a fixed disc release gap. As discovered by the applicant, the disc release gap in the actual braking process is not fixed, but is constantly reduced after repeated braking, finally to less than 3 mm, which exceeds 3 to 6 mm as specified by requirements. The main reason is that the external lever is generally designed to be relatively slender so that it is difficult to control its elastic deformation during braking, and the brake regulator cannot recognize a situation that the disc release gap exceeds a predetermined value due to the elastic deformation of the lever being too large, so that the brake regulator performs the gap adjustment when the release gap adjustment is not required, and finally the disc release gap is gradually reduced after release of the brake caliper is completed.

As shown in FIG. 1, a typical brake caliper unit generally includes a brake cylinder 1', a brake caliper 2', a brake pad 3', a brake disc 5', etc. In addition to an external lever 4' having an amplifying function with an amplification of two times, the brake caliper 2' includes such components as a hanger and a brake pad carrier. Since the disc of the brake caliper unit has a release gap of 3-6 mm on both sides according to technical conditions of the brake caliper unit, the release gap of the disc is theoretically designed to be 4.5 mm on both sides. During braking of the vehicle, the brake cylinder 1' is filled with compressed air, and the compressed air pushes the piston in the brake cylinder 1' to expand, so that one end of the external lever 4' is moved outwardly and the other end close to the brake pad 3' is moved inwardly, finally pushing the brake pad 3' against the disc surface of the brake disc 5' to implement braking. As the braking time elapses during braking of the vehicle, the brake disc 5' and the brake pad 3' have different degrees of wear, respectively. Therefore, in order to ensure that the release gap of the brake disc 5' and the brake pad 3' is relatively fixed in the released state of the brake caliper unit, it is necessary to integrate an automatic brake gap regulator (referred to as a brake regulator) inside the brake cylinder 1'. In most existing brake regulators, two pairs of multi-thread (the stroke of the screw rotation angle on its axis, which is related to the diameter and thread of the screw; in the case of limited space, the diameter of the screw is designed to remain unchanged; it is necessary to increase threads in order to increase the stroke resulting from rotation, generally using a 3-thread or 4-thread screw) non-self-locking nut are used to automatically adjust the pad gap.

The brake cylinder 1' is the most important component therein, with a structure as shown in FIG. 2, mainly including a cylinder block component 108', a guide screw component, a gap adjusting nut assembly 107', a piston component 109' and an adjusting shaft assembly 105', wherein the cylinder block component 108' is fittingly connected with a cylinder head 101', and the guide screw component includes a screw, a square key 102', a guide nut 103', a guide spring 104', and a taper sleeve 106'. Compressed air is filled into the cylinder block to push the piston component 109' to move to the right, whereby the guide nut 103' pushes the adjusting shaft to move to the right. When the release gap is 4.5 mm on both sides, the gap adjusting nut assembly 107' does not perform the gap adjustment function, but moves to the right along with the adjusting shaft until the square key 102' moves by a distance E to come into contact with the cylinder head 101' to stop the movement. At this point, the brake disc 5' and the brake pad 3' have been fitted together, and the braking is started. With the wear of the brake disc 5' and the brake pad 3', when the release gap exceeds 5.2 mm (that is, 28/40+4.5=5.2), the square key 102' abuts with the cylinder head 101', the adjusting shaft continues to move to the right at this point, and the brake regulator starts to automatically adjust the gap by 0.7 mm (that is, 28/40=0.7) to ensure that the release gap is fixed.

It can be understood that the preset size of the release gap of the brake caliper unit actually depends on the axial displacement of the square key in the brake cylinder. However, in the related art, the square key is usually connected with the gap adjusting nut assembly that is almost located at the innermost portion of the brake cylinder. Once the square key needs to be replaced to readjust the release gap, it cannot be removed from the brake cylinder without completely disassembling the various parts inside the entire brake cylinder. Therefore, such square key structure in the prior art is relatively complicated, making it inconvenient to readjust the release gap of the brake caliper unit.

In the braking process of the vehicle, a gap between the external lever 4' and the brake cylinder 1', a gap between the pin shaft and the brake pad carrier, a release gap between the brake disc 5' and the brake pad 3', and elastic deformation of the external lever 4' and the brake pad carrier all are considered as disc release gaps, and serve as the basis of gap adjustment made by the brake regulator. It is known that the accumulative out-of-tolerance gap of the brake pad carrier bushing, screw bushing and screw pin is 2×(0.33+0.63+0.1)=2.12 mm on both sides, and the external lever 4' has a theoretical elastic deformation of 3 mm. Accordingly, the accumulative out-of-tolerance gap is 2.12+3=5.12 mm. Therefore, if it is necessary to ensure that the theoretical design value of the disc release gap is 4.5 mm, the theoretical design value E of the brake regulator should be 5.12+4.5=9.62 mm, and a value of 9.7 mm can meet the requirement. As a result, when the above various gaps and elastic deformations exceed 9.7 mm, the brake regulator will start to act, and automatically adjusts the screw to advance by 0.7 mm, so that the disc release gap can be ensured to be fixed.

As analyzed on the basis of the structural principle of the above brake caliper unit, after the brake caliper clamps the brake disc 5' tightly, the release gap should remain fixed due to adjustment of release gap by the brake regulator through several times of braking and release. However, after many trials, the applicant found that actually the release gap is not fixed, but is reduced continuously after repeated braking and release, finally to less than 3 mm, which exceeds 3 to 6 mm as specified by requirements, making the release gap not meet the use requirements. In this process, although the brake regulator also performs gap adjustment, the various gaps and elastic deformations have greatly exceeded 9.7 mm, eventually leading to failure.

Through analysis, it is found that there are primarily two reasons for the failure:

(1) The elastic deformation of the external lever 4' is too large. The external lever 4' is generally designed to be slender due to requirements in terms of space, weight and braking force of the brake caliper unit, and it is difficult to control the elastic deformation of the external lever 4' in the braking process. In the braking process, the deformation of the external lever 4' exceeds 3 mm, which results in a total value of various gaps and elastic deformations exceeding 9.7 mm, so that the brake regulator gradually starts the gap adjustment due to the elastic deformation of the external lever 4' when no adjustment is required, which leads to continuous reduction of the release gap of the disc. If the rigidity of the external lever is increased alone, the product design requirements will not be met in terms of lever material, process, structure space and weight.

(2) The timing of gap adjustment by the brake regulator is inappropriate. The correct timing of the gap adjustment is when the wear of the brake disc 5' and the brake disc 3' exceeds the specified value. At this time, the disc release gap increases, resulting in the gap adjusting nut of the brake regulator being separated from the adjusting nut sleeve. The gap adjusting nut is rotatable on the screw, and since the brake regulator is unidirectionally operational, the gap adjusting nut cannot rotate in the opposite direction when the brake cylinder 1' is released, so that the adjusting nut performs the function of reducing the release gap. However, in the braking process of the brake caliper unit, the brake regulator, which cannot recognize that the total value exceeds 9.7 mm due to the increased elastic deformation of the external lever 4' (at this point, the disc release gap is not changed), triggers the gap adjustment of the brake regulator at a wrong timing, and the release gap of the disc is gradually reduced after completion of the release of the brake caliper.

As can be seen from the above, the gap adjustment function inside the brake cylinder 1' has a defect in structural design, which cannot be recognized by the brake regulator when the elastic deformation of the external lever 4' is increased, thereby triggering an unnecessary gap adjustment. In addition, the brake cylinder is small in volume and compact in structure, and is generally not provided with an amplification function. Rather, it amplifies the braking force by an external lever of the brake caliper unit. That is, the basic brake device generally only has one-stage amplification function.

SUMMARY OF THE INVENTION

In view of the defects in the prior art, a first object of the present disclosure is to provide a brake cylinder in which it is more convenient to adjust a brake release gap. A second object of the present disclosure is to provide a brake cylinder having a force amplification function, which not only amplifies common and parking braking forces, but also has a compact structure, light weight and high braking efficiency.

In order to achieve the above objects, a brake cylinder of the present disclosure includes a cylinder block and a cylinder head fixedly sleeved over one end of the cylinder block, the cylinder block being provided therein with a piston, a guide spring, a guide nut, a taper sleeve, an adjusting shaft assembly and a gap adjusting nut assembly, characterized in that the gap adjusting nut assembly includes a gap adjusting nut, a gap adjusting sleeve and a gap adjusting spring, and a groove extending along an axial direction of the gap adjusting sleeve is formed on an outer circumferential surface of the gap adjusting sleeve, in which groove a release gap adjusting unit is provided.

Preferably, there is a release gap between the release gap adjusting unit and an internal boss of the cylinder block.

In the present disclosure, due to the groove extending along the axial direction provided on the outer circumferential surface of the gap adjusting sleeve and the release gap adjusting unit provided in the groove, it is convenient to adjust of the size of the release gap by changing an axial length of the release gap adjusting unit. Moreover, installation and disassembly of the release gap adjusting unit as provided is also extremely simple.

Preferably, the cylinder block is further provided therein with a set of internal lever assemblies uniformly arranged along a circumferential direction of the adjusting shaft, one end of the internal lever assembly abutting with a thrust sleeve, and the other end thereof abutting with the piston.

Preferably, the internal lever assembly includes a lever body composed of two brackets and an intermediate portion connecting the two brackets together, the intermediate portion being formed with a transverse through hole in which a middle fulcrum pin is inserted, two ends of the middle fulcrum pin being respectively provided with a needle bearing, a first pin hole being provided on an inner side of one end of the bracket and fitted to a first pin over which a first bearing is sleeved, and a second pin hole being provided on an inner side of the other end of the bracket and fitted to a second pin over which a second bearing is sleeved.

In the above configuration, change in amplification of a braking force can be achieved by changing amplification of the lever body.

Preferably, contact surfaces between the taper sleeve and the guide nut form a taper surface fitting, and the taper sleeve is slidably fitted with the guide nut to form a first clutch; the guide nut is connected with one end of the guide spring, the other end of the guide spring is connected with a block provided on the adjusting shaft, and a piston tube cover connected to an inner thread of the thrust sleeve is sleeved over an outer circumferential surface of the block; a thrust sleeve spring is disposed between the thrust sleeve and the taper sleeve, a cylinder head is sleeved over an outer circumferential surface of the thrust sleeve, and a piston return spring is disposed between the cylinder head and the thrust sleeve.

Preferably, one end of the thrust sleeve spring abuts with the thrust sleeve, the other end abuts with the taper sleeve, one end of the piston return spring abuts with the thrust sleeve, and the other end abuts with the cylinder head through the piston.

Preferably, contact surfaces between the gap adjusting nut and the gap adjusting sleeve form a taper surface fitting, and the gap adjusting nut is slidably fitted with the gap adjusting sleeve to form a second clutch; one end of the gap adjusting spring abuts with the gap adjusting nut, and the other end abuts with a clamp spring fixedly connected to the gap adjusting sleeve.

Preferably, a first groove, a second groove, and a third groove are sequentially disposed on the piston from inside to outside in a radial direction thereof, an inner sealing ring is disposed in the first groove, a sealing ring is disposed in the third groove, and the sealing ring and the inner sealing ring seal the piston and the cylinder head.

Preferably, a groove hole extending along an axial direction of the thrust sleeve is formed on an outer circumferential surface of the thrust sleeve, in which groove hole a stop screw is disposed.

Preferably, the release gap adjusting unit is a pin, and further preferably, the release gap adjusting unit is a cylindrical pin.

Preferably, the adjusting shaft assembly includes an adjusting shaft and a yoke fitted at one end of the adjusting shaft, a taper sleeve is sleeved over the adjusting shaft, a rear end portion of the adjusting shaft is partially inserted into a cavity of the cylinder block and a front end is inserted into a shaft hole of the yoke, the adjusting shaft has an external thread, and the adjusting shaft passes through an adjusting shaft hole located in the middle of the cylinder head to abut against a rear cover.

Preferably, an extension extending inwardly is provided on upper and lower ends of the yoke, on which extension a bushing is provided.

The present disclosure has the advantages of compact structure, easy implementation, and safe and reliable use, and, with a lever assembly inside the brake cylinder, can output a larger braking force without increasing the volume of the brake cylinder under the same air pressure condition, thereby realizing large braking force and large parking force. Moreover, such structures as the thrust spring can recognize excessive elastic deformation of the external lever, avoiding the gap adjustment triggered by the excessive elastic deformation of the external lever, ensuring that the release gap of the disc is fixed, and avoiding a virtual braking of the disc caused by gradually reduced gap between the brake disc and the brake pad due to the deformation of the external lever.

Another object of the present disclosure is to provide a brake caliper unit capable of recognizing lever deformation in view of the defects in the prior art, which can not only recognize excessive elastic deformation of the external lever, but also avoid gap adjustment triggered by the excessive elastic deformation of the external lever.

In order to achieve the above object, a brake caliper unit capable of recognizing lever deformation of the present disclosure includes: a brake cylinder, a hanger, a brake pad carrier component, an external lever component, and a housing component; wherein the brake cylinder is the brake cylinder according to any one of the aforementioned.

Preferably, the guide nut is connected to one end of the guide spring, the other end of the guide spring is connected with a block, a piston tube cover is disposed on an outer circumferential surface of the block, the piston tube cover is connected to an inner thread of a thrust sleeve, and a thrust sleeve spring is provided between the thrust sleeve and the taper sleeve.

The thrust sleeve spring of the present disclosure can recognize deformation of the external lever, thus avoiding triggering of gap adjustment in the case of deformation of the external lever during braking; the gap adjusting nut assembly is used to prevent the gap adjustment triggered when the external resistance to the brake cylinder is sufficiently large (that is, when the external lever is deformed, the resistance is far greater than the thrust required before contact of the disc), so as to ensure a constant disc gap, and also ensure that when the disc gap is larger than the release gap (the release gap is a release gap between the release gap adjusting unit and an internal boss of the cylinder block), the gap adjustment function is triggered to ensure a constant disc gap.

Preferably, contact surfaces between the taper sleeve and the guide nut form a taper surface fitting, the taper sleeve includes a taper sleeve tube and a projection disposed at a front end of the taper sleeve tube, the projection has an inner taper hole, and the guide nut includes a guide nut tube and a projection block disposed at a rear end of the guide nut tube; the projection block having an outer taper surface that can abut against the inner taper hole of the projection, and the guide nut is slidably fitted with the taper sleeve to form a first clutch; the thrust sleeve includes a thrust sleeve tube and inner and outer flanges disposed at a rear end of the thrust sleeve tube, one end of the thrust sleeve spring abuts with the inner flange of the thrust sleeve, and the other end abuts with the projection of the taper sleeve; a cylinder head is sleeved over an outer circumferential surface of the thrust sleeve, and a piston return spring is disposed between the cylinder head and the thrust sleeve, wherein one end of the piston return spring abuts with the outer flange of the thrust sleeve, and the other end abuts with the cylinder head through a piston.

Preferably, the gap adjusting nut includes a gap adjusting nut tube and a protrusion block disposed at a rear end of the gap adjusting nut tube, the protrusion block has an outer taper surface with a first taper tooth, and the gap adjusting sleeve includes a gap adjusting sleeve tube and a protrusion disposed at a rear end of the gap adjusting sleeve tube; the protrusion has an inner taper hole, a side wall of the inner taper hole has a second taper tooth cooperating with the first taper tooth, the outer taper surface of the protrusion block is able to cooperating with the inner taper hole of the protrusion, and the gap adjusting nut is slidably fitted with the gap adjusting sleeve to form a second clutch; the gap adjusting spring is sleeved over the gap adjusting nut tube, with one end thereof abutting with the protrusion block of the gap adjusting nut, and the other end abutting with a clamp spring fixedly connected to the gap adjusting sleeve.

Preferably, the adjusting shaft assembly includes an adjusting shaft and a yoke fitted at one end of the adjusting shaft, a taper sleeve is sleeved over the adjusting shaft, a rear end portion of the adjusting shaft is partially inserted into a cavity of the cylinder block, and a front end is inserted into a shaft hole of the yoke; the adjusting shaft has an external thread, the adjusting shaft passes through an adjusting shaft hole located in the middle of the cylinder head to abut against a rear cover, and an extension extending inwardly is disposed on upper and lower ends of the yoke, the extension being provided with a bushing.

Preferably, the hanger, formed in a rectangular shape, has four corners each provided with a wing block protruding outwardly, which wing block is provided with a bolt hole cooperating with a hanging bolt, wherein the hanger is fixedly connected to a vehicle bogie through the hanging bolt, and a rectangular block extending vertically downward is arranged on both sides of a lower end of the hanger; the housing component is composed of upper and lower housings, wherein the upper housing is cylindrical and fastened between the two rectangular blocks, and connecting bolts passing through the rectangular block are provided at two ports of the cylindrical upper housing; the lower housing has a rectangular parallelepiped shape, a curved block is provided on both sides of the lower housing, and the curved blocks are connected to the external lever component via a connecting pin.

Preferably, the external lever component includes a body in a ladder shape and arranged in a lateral direction, wherein an intermediate portion of the body has a square hole groove fitted in cooperation with the curved block, the body has a first concave frame at one end and a second concave frame at the other end, upper and lower arms of the first concave frame are respectively connected to the brake cylinder by a threaded pin, and upper and lower arms of the second concave frame are respectively connected to the brake pad carrier component through a support pin.

Preferably, the brake pad carrier component includes a brake pad carrier, a support pin, a split pin, a spring, a brake pad carrier stop-sleeve, an elastic pin, a brake pad carrier stop-block and a torsion spring, wherein the brake pad carrier is provided thereon with a brake pad, an upper portion of the brake pad carrier is provided with an upper pin mounting seat fitted with the upper arm of the second concave frame, the upper pin mounting seat is provided with an upper pin hole fitted with the upper support pin, a lower end of the upper support pin is formed with a split pin hole cooperating with the split pin, and a lower portion of the brake pad carrier is provided with a lower pin mounting seat fitted with the lower arm of the second concave frame; the lower pin mounting seat is provided with a lower pin hole fitted with the lower support pin, a lower end of the lower support pin is installed with the brake pad carrier stop-sleeve, and the brake pad carrier stop-sleeve is provided with an elastic pin for fixing the lower support pin; a spring is sleeved over the lower support pin above the brake pad carrier stop-sleeve, a brake pad carrier stop-block is provided at the brake pad carrier stop-sleeve on the brake pad carrier, and the brake pad carrier is connected with the brake pad carrier stop-block via the torsion spring.

By adopting the gap adjusting nut assembly and the internal lever assembly, the present disclosure can not only avoid the gap adjustment triggered in the case of a great external resistance to the brake cylinder (that is, when the external lever is deformed, the resistance is far greater than the thrust required before contact of the disc) to ensure a constant disc gap, but also triggers the gap adjustment function when the gap of the disc is larger than the release gap, thereby ensuring a constant disc gap. Meanwhile, with the internal lever assembly, a greater braking force can be output without increasing the volume and air pressure of the brake cylinder to achieve large braking force and large parking force, and realizing a secondary amplification function.

The present disclosure has the advantages of compact structure and easy implementation, and the thrust sleeve spring can recognize an excessive elastic deformation of the external lever, thus avoiding the gap adjustment triggered by the excessive elastic deformation of the external lever, ensuring that the release gap of the disc is fixed, and avoiding the virtual braking of the disc caused by gradually reduced gap between the brake disc and the brake pad due to the deformation of the external lever.

Yet another object of the present disclosure is to provide a rail vehicle including the brake caliper unit according to any one of the aforementioned. The braking system of the rail vehicle of the present disclosure has stable working performance, and the brake caliper unit thereof can not only recognize an excessive elastic deformation of the external lever, but also can avoid the gap adjustment triggered by the excessive elastic deformation of the external lever.

BRIEF DESCRIPTION OF THE DRAWINGS

FIG. 1 is a schematic structural view of a brake caliper unit in the prior art.

FIG. 2 is a schematic structural view of a brake cylinder in the prior art.

Figure 3:
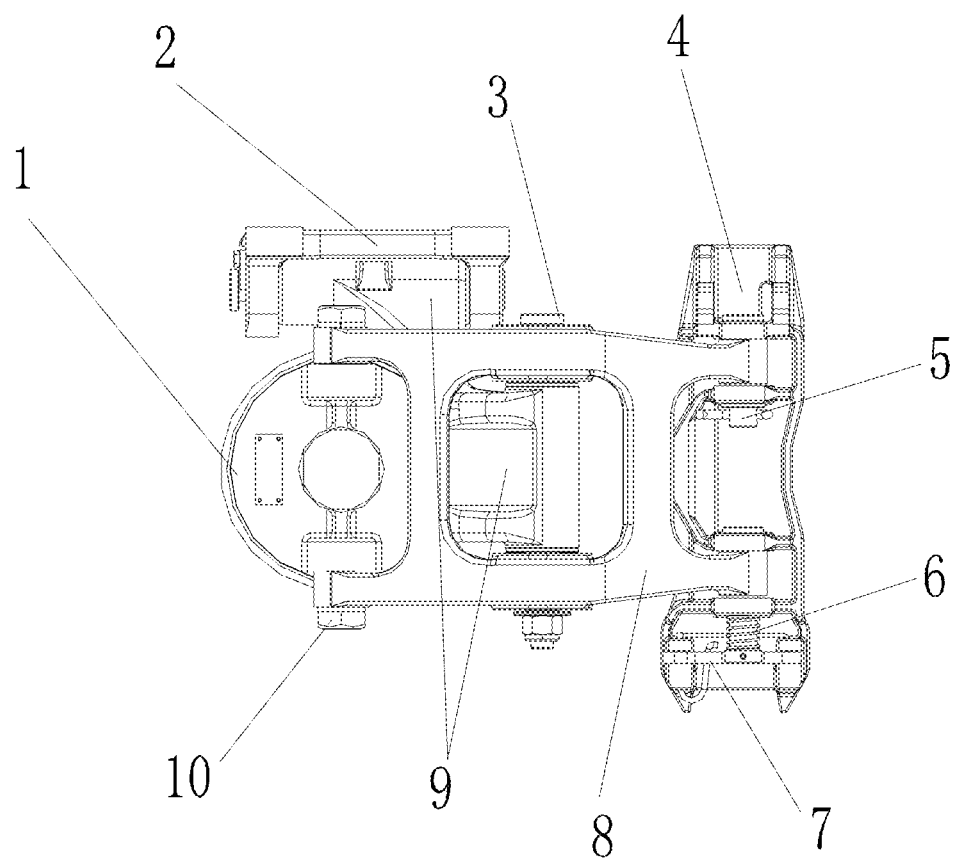
FIG. 3 is a schematic structural view of an embodiment of the present disclosure.
Figure 4:
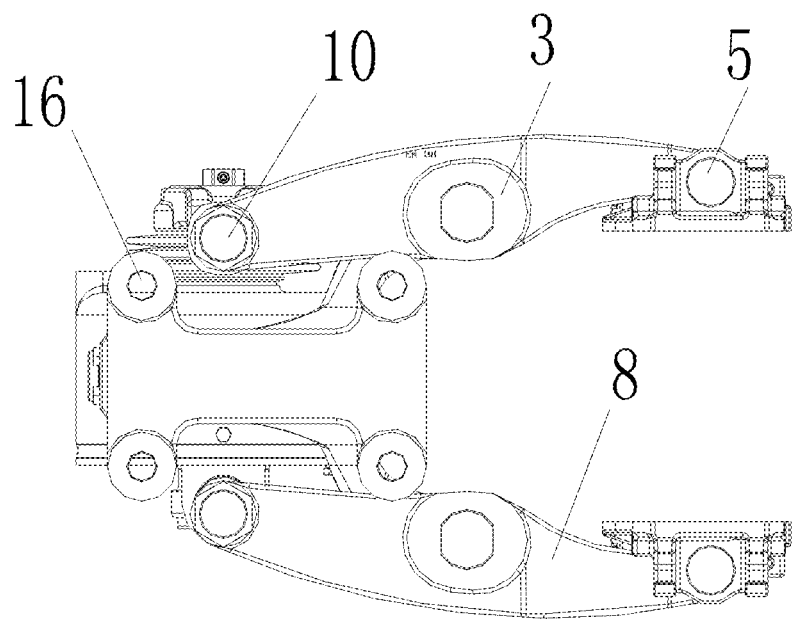
FIG. 4 is a top view of FIG. 3.
Figure 5:
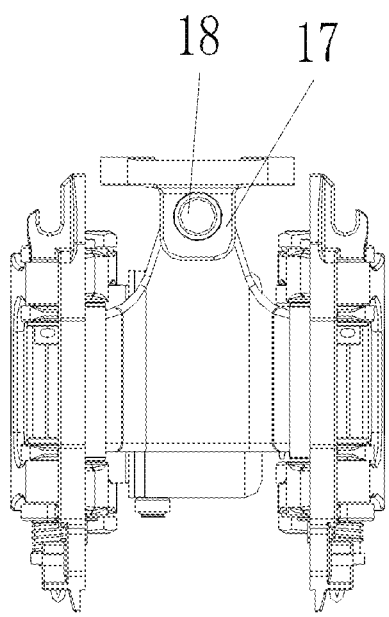
FIG. 5 is a front view of FIG. 3.
Figure 6:
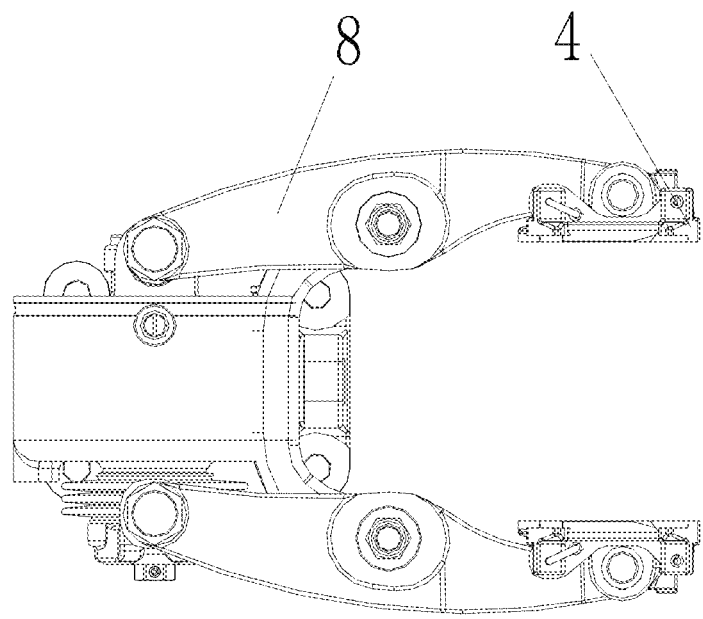
FIG. 6 is a bottom view of FIG. 3.
Figure 7:
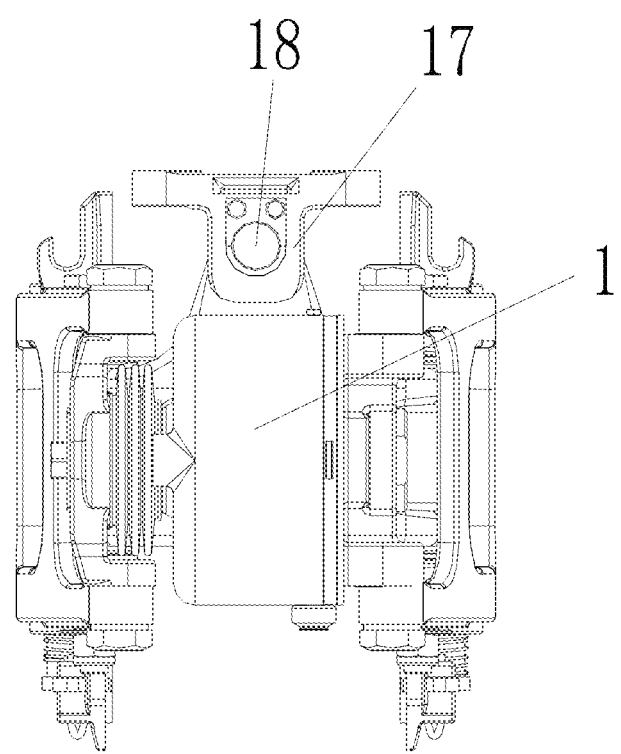
FIG. 7 is a rear view of FIG. 3.
Figure 8:
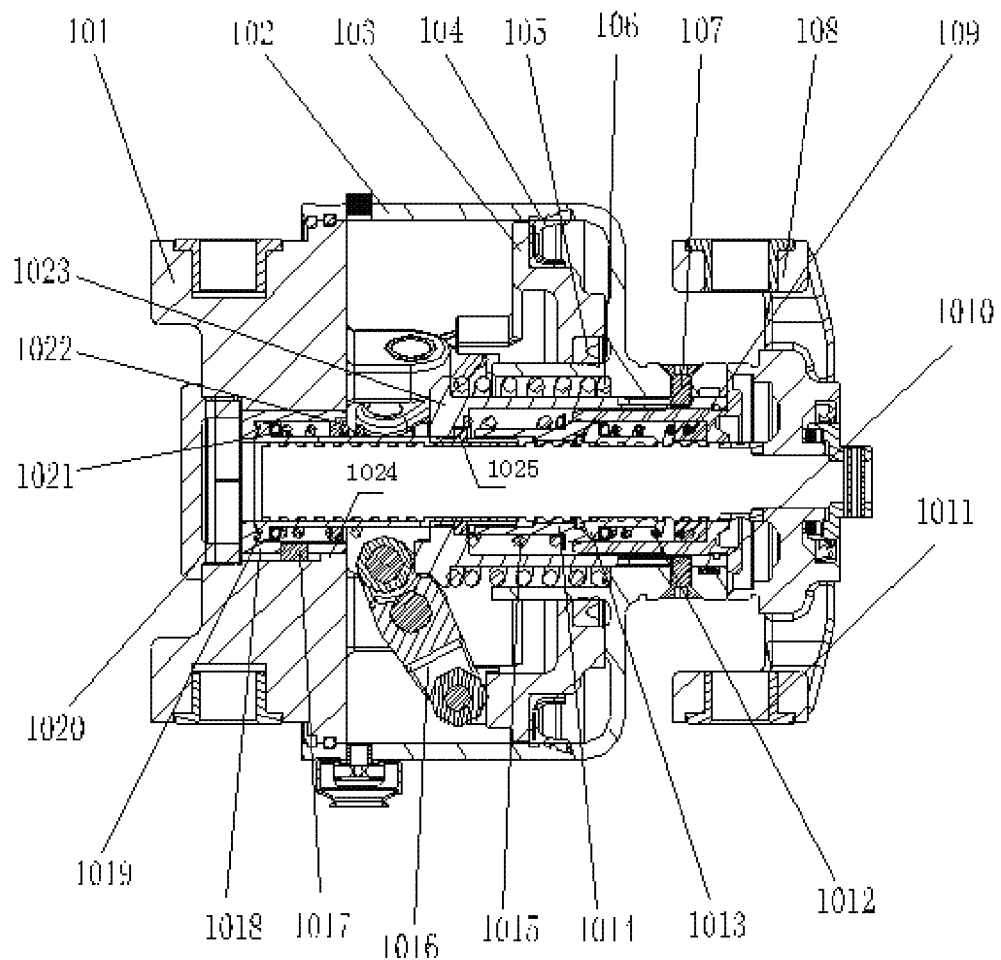
FIG. 8 is a schematic structural view of a brake cylinder of the present disclosure.
Figure 9:
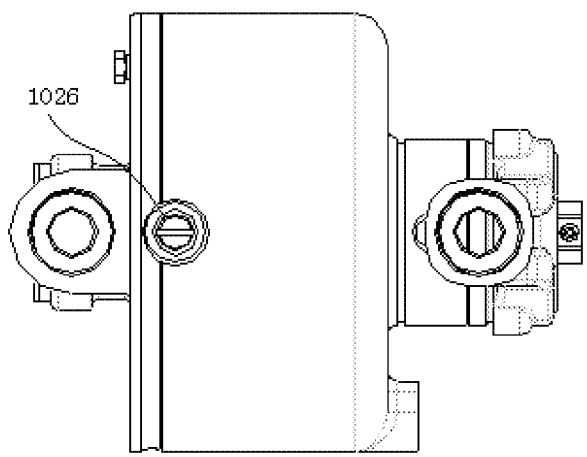
FIG. 9 is a bottom view of FIG. 8.
Figure 10:
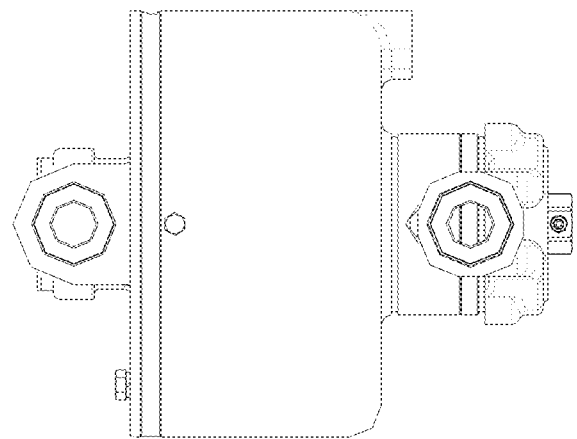
FIG. 10 is a top view of FIG. 8.
Figure 11:
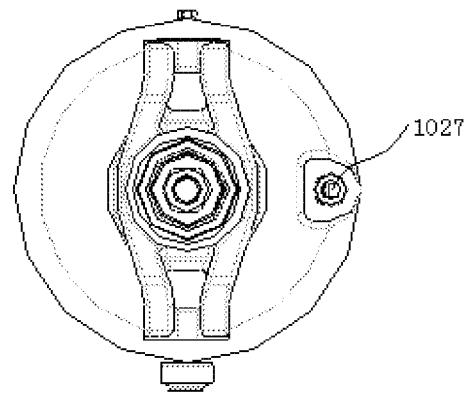
FIG. 11 is a right side view of FIG. 8.
Figure 12:
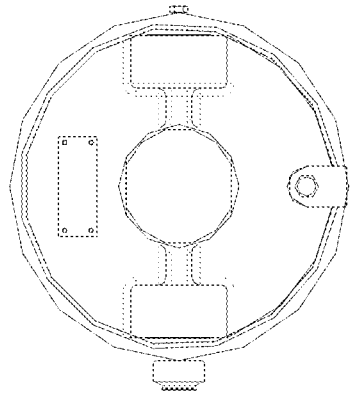
FIG. 12 is a left side view of FIG. 8.

In the drawings: 1'. brake cylinder; 2'. brake caliper; 3'. brake pad; 4'. lever; 5'. brake disc; 101'. cylinder head; 102'. square key; 103'. guide nut; 104'. guide spring; 105'. adjusting shaft assembly; 106'. taper sleeve; 107'. gap adjustment nut assembly; 108'. cylinder block component; 109'. piston component; 1. brake cylinder; 2. hanger; 3. connecting pin; 4. brake pad carrier component; 5. support pin; 6. spring; 7. brake pad carrier stop-block; 8. external lever component; 9. housing component; 10. threaded pin; 11. brake pad carrier; 12. split pin; 13. brake pad carrier stop-sleeve; 14. elastic pin; 15. torsion spring; 16. bolt hole; 17. rectangular block; 18. connecting bolt; 101. cylinder block; 102. cylinder head; 103. piston; 104. sealing ring; 105. inner sealing ring; 106. piston return spring; 107. stop screw; 108. adjusting shaft assembly; 109. block; 1010. piston tube cover; 1011. bushing; 1012. guide spring; 1013. guide nut; 1014. taper sleeve; 1015. thrust sleeve spring; 1016. internal lever assembly; 1016-1. first bearing; 1016-2. first pin; 1016-3. intermediate fulcrum pin; 1016-4. needle bearing; 1016-5. lever body; 1016-6. second pin; 1016-7. second bearing; 1017. release gap adjustment unit; 1018. gap adjustment sleeve; 1019. gap adjustment nut; 1020. rear cover; 1021. gap adjustment spring; 1022. clamp spring; 1023. thrust sleeve; 1024. internal boss; 1025. gasket; 1026. vent; 1027. air inlet; 901. upper housing; 902. lower housing; 903. curved block; 904. connecting pin hole

DETAILED DESCRIPTION OF THE EMBODIMENT(S) OF THE INVENTION

Embodiment 1

A brake cylinder 1 of the present embodiment can conveniently adjust a release gap. The brake cylinder 1 includes a cylinder block 101 and a cylinder head 102 fixedly sleeved over one end of the cylinder block 101. A piston 103, a guide spring 1012, a guide nut 1013, a taper sleeve 1014, an adjusting shaft assembly 108 and a gap adjusting nut assembly are provided in the cylinder block 101. The gap adjusting nut assembly includes a gap adjusting nut 1019, a gap adjusting sleeve 1018 and a gap adjusting spring 1021, and a groove extending in an axial direction of the gap adjusting sleeve 1018 is formed on an outer circumferential surface of the gap adjusting sleeve 1018. A release gap adjusting unit 1017 is provided in the groove.

The gap adjusting nut assembly includes a gap adjusting nut 1019, a gap adjusting sleeve 1018 and a gap adjusting spring 1021. The gap adjusting nut 1019 is sleeved over a rear end of the adjusting shaft, and the gap adjusting sleeve 1018 is sleeved over the gap adjusting nut 1019. The gap adjusting nut 1019 includes a gap adjusting nut tube and a protrusion block disposed at a rear end of the gap adjusting nut tube, and the protrusion block has an outer taper surface with a first taper tooth. The gap adjusting sleeve 1018 includes a gap adjusting sleeve tube and a protrusion disposed at a rear end of the gap adjusting sleeve tube, the protrusion has an inner taper hole, and a side wall of the inner taper hole of the protrusion has a second taper tooth matching with the first taper tooth, such that the outer taper surface of the protrusion block could cooperate with the inner taper hole of the protrusion. That is, the gap adjusting nut 1019 and the gap adjusting sleeve 1018 are fitted by taper teeth, and the gap adjusting nut 1019 and the gap adjusting sleeve 1018 can be slidingly fitted to form a second clutch.

In addition, there is a groove between a tail portion of the gap adjusting nut tube and an inner flange of a thrust sleeve 1023, and a gasket 1025 is disposed in the groove. The gasket 1025 can be in contact with a front end of the taper sleeve 1014, the gasket 1025 has two bosses therein, and two groove holes (upper and lower holes) that can match with the bosses are provided on an outer circumferential surface of the gap adjusting nut 1019. The gap adjusting spring 1021 is disposed between the gap adjusting nut 1019 and the gap adjusting sleeve 1018. The gap adjusting spring 1021 is sleeved over the gap adjusting nut tube, with one end abutting with a protrusion block of the gap adjusting nut 1019, and the other end abutting with a clamp spring 1022 fixedly connected to the gap adjusting sleeve 1018. The clamp spring 1022 functions to abut against the gap adjusting spring 1021 to keep the gap adjusting spring 1021 in a compressed state, so that the gap adjusting nut 1019 and the gap adjusting sleeve 1018 of the second clutch can maintain a taper tooth engagement state.

In addition, the outer circumferential surface of the gap adjusting sleeve 1018 is formed with a groove extending in an axial direction of the gap adjusting sleeve 101. The groove is provided therein with a release gap adjusting unit 1017, which may be an axially disposed pin. The axial direction refers to the axial direction of the brake cylinder 1 (i.e., the axial direction of the gap adjustment nut tube). The release gap adjusting unit 1017 may be a cylindrical pin. That is, the pin may be a cylindrical pin, and correspondingly, the groove has a circular cross section. The cylindrical pin and the circular groove are convenient to be processed and low in cost. Of course, the pin may have a square cross section, and correspondingly the cross section of the groove is also square. Herein, the pin is not limited to a particular shape.

Basic brake devices include a brake caliper, a brake disc and a brake pad, and a constant gap needs to be maintained between the brake disc and the brake pad, and this gap is set by the release gap adjusting unit 1017 in the brake cylinder 1. When the gap of the disc is larger than a set value (release gap), at this point, the gap adjusting nut assembly of the brake cylinder 1 will trigger the gap adjustment function to ensure that the gap of the disc is always constant. In addition, the size of the gap of the disc can be set by adjusting the length of the pin. That is, the size of the release gap can be determined by the length of the pin, upon the principle that, when compressed gas is charged into the cylinder block, the piston 103 and a thrust sleeve 1023 are pushed to move to the right, the thrust sleeve 1023 drives the guide nut 1013 to move to the right by the thrust sleeve spring 1015, and the guide nut 1013 in turn drives the adjusting shaft to move, so that the adjusting shaft drives the gap adjusting nut 1019 to move to the right; when the gap adjusting nut 1019 drives the pin into contact with the cylinder block 101, the gap adjusting nut 1019 compresses the gap adjusting spring 1021 and is disengaged from the gap adjusting sleeve 1018, at which time the gap adjusting function is triggered.

The gap between the release gap adjusting unit 1017 (pin) and the inner boss 1024 of the cylinder block 101 is a preset release gap, and the size of the preset release gap is mainly determined by the difference between an axial length of the axially extending groove and an axial length of the pin. The release gap can be conveniently adjusted by adjusting the length by which the release gap adjusting unit 1017 (pin) extends into the groove, and there is no need to disassemble the cylinder during the adjustment. The release gap adjusting unit 1017 is exposed by merely removing the rear cover 1020 on the cylinder block 101, thus making the adjustment convenient.

Embodiment 2

The brake cylinder 1 of the present embodiment has a force amplifying function. The brake cylinder 1, with a structure as shown in FIGS. 8 to 12, includes a cylinder block 101 and a cylinder head 102 fixedly sleeved over one end of the cylinder block 101. A vent 1026 (shown in FIG. 9) and an air inlet 1027 (shown in FIG. 11) are provided on the cylinder head 102, and in the cylinder block 101 are provided a piston 103, a guide spring 1012, a guide nut 1013, a taper sleeve 1014, an adjusting shaft assembly 108 and a gap adjusting nut assembly, wherein the adjusting shaft assembly 108 includes an adjusting shaft, with a rear end portion inserted into a cavity of the cylinder block 101, and a front end inserted into a shaft hole of a yoke. The yoke has an extension extending inwardly at upper and lower ends thereof, respectively. A bushing 1011 is provided on the extension. A bellows may also be disposed between the cylinder head 102 and the yoke. The adjusting shaft has an external thread. The guide nut 1013 has a trapezoidal thread matched with the external thread. The adjusting shaft abuts with the rear cover 1020 after passing through an adjusting shaft hole in the middle of the cylinder head 102. In addition, threaded holes matched with a threaded pin 10 are formed on the upper and lower ends of the cylinder block 101 and the upper and lower ends of the yoke, so that the threaded pin 10 is locked into the upper end of the cylinder block 101/yoke through an upper arm of a first concave frame, and meanwhile the threaded pin 10 is locked into the lower end of the cylinder block 101/yoke through a lower arm of the first concave frame, thereby mounting the external lever component 8 on the brake cylinder 1.

A taper sleeve 1014 is sleeved over the adjusting shaft. The taper sleeve 1014 includes a taper sleeve tube and a projection disposed at a front end of the taper sleeve tube. The projection has an inner taper hole. The guide nut 1013 includes a guide nut tube and a projection block disposed at a rear end of the guide nut tube, wherein the projection block has an outer taper surface that can abut against the inner taper hole of the projection. That is, contact surfaces between the taper sleeve 1014 and the guide nut 1013 form a taper surface fitting, by which the guide nut 1013 is slidably fitted with the taper sleeve 1014 to form a first clutch. The projection block of the guide nut 1013 is connected to one end of the guide spring 1012, and the other end of the guide spring 1012 is connected to a block 109 sleeved over the adjusting shaft. A piston tube cover 1010, sleeved over an outer circumferential surface of the block 109, is connected to an inner thread of the thrust sleeve 1023. A thrust sleeve spring 1015 is provided between the thrust sleeve 1023 and the taper sleeve 1014. The thrust sleeve spring 1015 includes a thrust sleeve tube and inner and outer flanges disposed at a rear end of the thrust sleeve tube, and has one end abutting with the inner flange of the thrust sleeve 1023 and the other end abutting with the projection of the taper sleeve 1014. The thrust sleeve spring 1015 can recognize deformation of the external lever component 8 to prevent gap adjustment. The specific method by which the thrust sleeve spring 1015 recognizes the deformation of the external lever component 8 is as follows: in the case of presence of a disc gap, the adjusting shaft of the brake cylinder 1 requires a small pushing force, and at this point it is the thrust spring force provided by the thrust sleeve spring 1015 that pushes the adjusting shaft. When the disc starts to come into contact, the external lever component 8 is at the deformation starting stage, and the deformation force of the external lever component 8 is far greater than the thrust spring force; at this point, the thrust sleeve spring 1015 cannot push the adjusting shaft. In this case, the thrust sleeve spring 1015 is compressed, and the gasket 1025 can be brought into close abutment with the taper sleeve 1014 with only a small compression amount, for example, 0.5 mm of compression of the thrust sleeve spring 1015. Since there is a friction force between the gasket and the taper sleeve, the gasket 1025 is not rotatable. In addition, with the concave-convex fitting between the gasket 1025 and the gap adjustment nut 1019, the gap adjusting nut 1019 is also not rotatable, and can only move to the left with the adjusting shaft. Since the gap adjusting nut 1019 is not rotatable, the gap adjusting nut assembly is not subject to gap adjustment in the deformation stage of the external lever component 8, which avoids unwanted gap adjustment in the case of deformation of the external lever component 8. Only when the disc gap is larger than the preset release gap and when the zero-stroke thrust sleeve spring 1015 pushes the adjusting shaft, the gap adjusting nut 1019 can be rotated in a circumferential direction relative to a screw of the adjusting shaft, that is, gap adjustment occurs.

Figure 13:
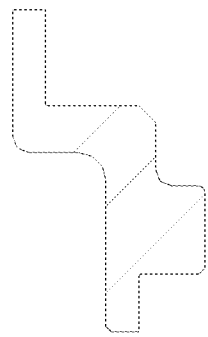
FIG. 13 is a partially enlarged view of a piston of the present disclosure.

Besides, a groove hole extending in an axial direction of the thrust sleeve 1023 is formed on an outer circumferential surface of the thrust sleeve 1023, and a stop screw 107 is provided in the groove hole. A cylinder head 102 is further sleeved over the outer circumferential surface of the thrust sleeve 1023. A piston return spring 106 is disposed between the cylinder head 102 and the thrust sleeve 1023. One end of the piston return spring 106 abuts with the outer flange of the thrust sleeve 1023, and the other end abuts with the cylinder head 102 through the piston 103. A first groove, a second groove, and a third groove (see FIG. 13) are sequentially disposed on the piston 103 from inside to outside in a radial direction thereof, an inner sealing ring 105 is disposed in the first groove, and a sealing ring 104 is disposed in the third groove, wherein the sealing ring 104 and the inner sealing ring 105 seal the piston 103 and the cylinder head 102.

For the relevant structure of the gap adjusting nut assembly, please refer to the Embodiment 1.

Figure 14:
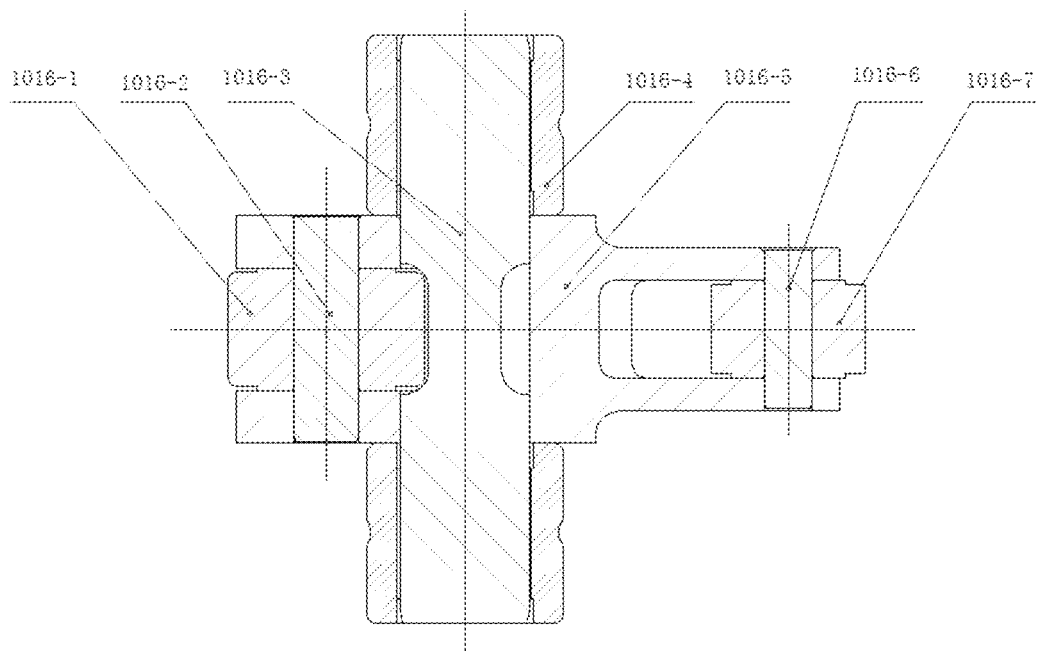
FIG. 14 is a schematic structural view of an internal lever assembly of the present disclosure.

Three internal lever assemblies 1016 uniformly arranged along the circumferential direction of the adjusting shaft are further provided in the cylinder block 101. The structure of the internal lever assembly 1016 is shown in FIG. 14, including a lever body 1016-5 composed of two brackets and an intermediate portion connecting the two brackets together. The intermediate portion is formed with a transverse through hole in which a middle fulcrum pin 1016-3 is inserted, and two ends of the middle fulcrum pin 1016-3 are respectively provided with a needle bearing 1016-4. The lever body 1016-5 is mounted in an inner groove of the cylinder block 101 via the two needle bearings 1016-4, thereby implementing the fixing and supporting function. A first pin hole is provided on an inner side of one end of the bracket and fitted to a first pin 1016-2 over which a first bearing 1016-1 is sleeved. The first bearing 1016-1 abuts against the thrust sleeve 1023 for connection, and a second pin hole is provided on an inner side of the other end of the bracket and fitted to a second pin 1016-6 over which a second bearing 1016-7 is sleeved. The second bearing 1016-7 abuts against the piston 103 for connection. The first bearing 1016-1 and the second bearing 1016-7 can bear the braking force, with a small friction resistance and a high braking efficiency, and moreover the braking force can be amplified with no need for special hardening treatment of the lever body 1016-5. As such, the first bearing 1016-1 at one end of the internal lever assembly 1016 abuts with the thrust sleeve 1023, and the second bearing 1016-7 at the other end thereof abuts with the piston 103. When the piston 103 pushes the first bearing 1016-1, the second bearing 1016-7 is driven to move so that the thrust sleeve 1023 is pushed and moved. In the case of a constant air pressure, the brake cylinder 1 realizes amplification of the braking force through the internal lever assembly 1016. In addition, adjustment of the amplification of the internal lever assembly 1016 can also achieve adjustment of the amplification of the braking force.

Embodiment 3

Figure 15:
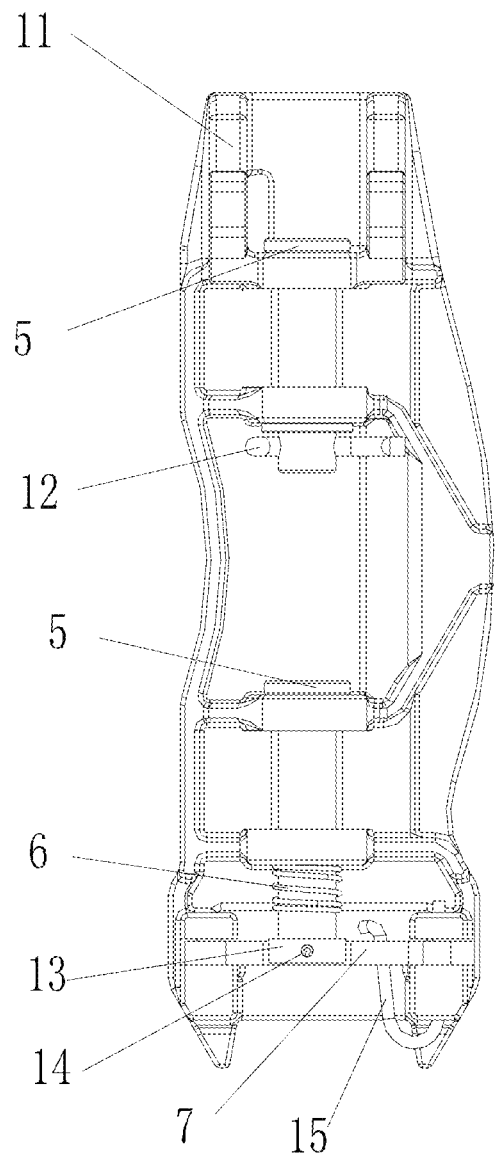
FIG. 15 is a schematic structural view of a brake pad carrier component of the present disclosure.
Figure 16:
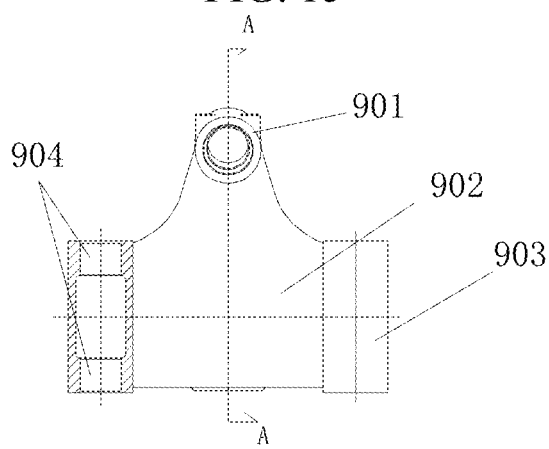
FIG. 16 is a schematic structural view of a housing component of the present disclosure.
Figure 17:
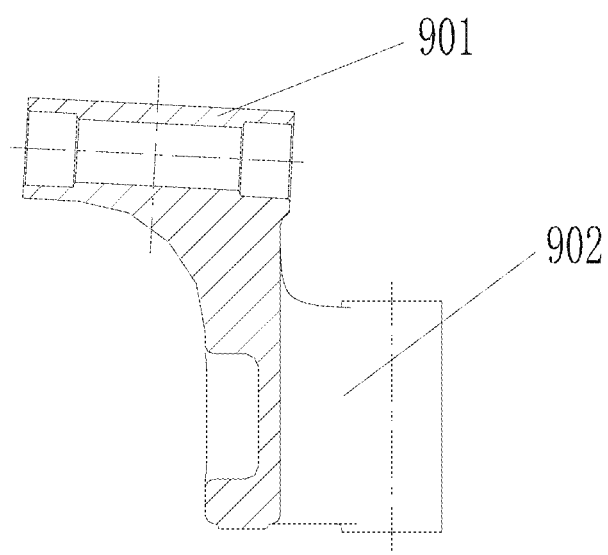
FIG. 17 is a cross-sectional view taken along line A-A in FIG. 16.

The brake caliper unit of the present embodiment can recognize deformation of the lever, with a structure as shown in FIG. 3 to FIG. 7, including a brake cylinder 1, a hanger 2, two brake pad carrier components 4, two external lever components 8 and a housing component 9. The two external lever components 8 are respectively arranged on both sides of the brake cylinder 1, and an adjusting shaft of the brake cylinder 1 is connected to the external lever components 8. The two external lever components 8 may be contracted and expanded under the driving of the adjusting shaft of the brake cylinder 1, so that the two external lever components 8 constitute a lever-caliper mechanism. The hanger 2, formed into a rectangular shape, has four corners thereof respectively provided with an outwardly protruding wing block. The wing block is provided with a bolt hole 16, and a hanging bolt is provided to cooperate with the bolt hole 16. The hanger 2 is fixedly connected with the vehicle bogie by the hanging bolts. A rectangular block 17 extending vertically downward is provided on both sides of a lower end of the hanger 2; the housing component 9 is composed of upper and lower parts, with a structure as shown in FIGS. 16 and 17. The upper housing 901, formed into a cylindrical shape, is fastened between the two rectangular blocks 17, and connecting bolts 18 passing through the rectangular blocks 17 are provided at two ports of the cylindrical upper housing 901. The lower housing 902, having a rectangular parallelepiped shape, has a curved block 903 on each side thereof, and at two ends of the curved block 903 is provided a connecting pin hole 904 in which a connecting pin 3 is disposed. The external lever component 8 includes a main body having a ladder-like shape and arranged in a lateral direction. A square hole groove is provided at the middle of the main body so as to be fitted to the curved block 903. The connecting pin 3 is locked into the connecting pin hole 904 of the curved block 903 after passing through walls of the square hole groove of the external lever components 8, achieving connection of the external lever component 8 to the curved block 903. The main body has a first concave frame at one end and a second concave frame at the other end, wherein upper and lower arms of the first concave frame are respectively connected to the brake cylinder 1 via the threaded pins 10, and upper and lower arms of the second concave frame are respectively connected to the brake pad carrier components 4 via the support pins 5. As shown in FIG. 15, the brake pad carrier components 4 include a brake pad carrier 11, a support pin 5, a split pin 12, a spring 6, a brake pad carrier stop-sleeve 13, an elastic pin 14, a brake pad carrier stop-block 7 and a torsion spring 15. A brake pad is provided on the brake pad carrier 11. Interface of the brake pad carrier 11 is a dovetail interface of the UIC standard, and the brake pad is a powder metallurgy brake pad. An upper pin mounting seat is provided at an upper portion of the brake pad carrier 11 so as to be fitted to the upper arm of the second concave frame. On the upper pin mounting seat is provided an upper pin hole for fitting with the upper support pin 5. A split pin hole fitted with the split pin 12 is disposed at a lower end of the upper support pin 5. A lower pin mounting seat is provided at a lower portion of the brake pad carrier 11 so as to be fitted to the lower arm of the second concave frame. On the lower pin mounting seat is provided a lower pin hole for fitting with the lower support pin 5. At a lower end of the lower support pin 5 is installed the brake pad carrier stop-sleeve 13, on which the elastic pin 14 is provided for fixing the lower support pin 5. The spring 6 is sleeved over the lower support pin 5 above the brake pad carrier stop-sleeve 13. The brake pad carrier stop-block 7 is provided at the brake pad carrier stop-sleeve 13 on the brake pad carrier 11. The brake pad carrier 11 is connected to the brake pad carrier stop-block 7 via the torsion spring 15.

Please refer to Embodiment 2 for the structure of the brake cylinder 1.

The working process of the brake caliper unit is as follows: during the traveling of the vehicle, when braking is required, the vehicle control system introduces compressed air into the brake cylinder 1 via an air inlet of the cylinder block 101 of the brake cylinder, and the compressed air pushes the piston 103 to move forward. The piston 103 is coupled to the internal lever assembly 1016, and the internal lever assembly 1016 pushes the thrust sleeve 1023 to move so as to drive the adjusting shaft to move together. The adjusting shaft transmits the braking force to the external lever components 8 to push one end of the lever-caliper mechanism to be opened and the other end thereof to be contracted, so that the brake pad carrier 11 mounted at the contracted end is also contracted so as to drive the brake pad to press tightly against a friction surface of the brake disc rotating at high speed. At this point, a frictional resistance is generated between the brake disc and the brake pad to achieve braking of the vehicle. When braking is not required, the compressed air is discharged from the air inlet on the cylinder block 101 of the brake cylinder, and the piston return spring 106 returns the piston 103, the gap adjusting nut component and the shaft return mechanism to the respective original positions, disengaging the brake disc from the brake pad and releasing the braking.

The specific working process of the brake cylinder 1 is as follows: when compressed air is filled into the cylinder block 101, the compressed gas pushes the piston 103 to move to the right, the piston 103 in turn pushes the internal lever assembly 1016 to move to amplify the braking force, and the internal lever assembly 1016 pushes the thrust sleeve 1023 to move to the right. At this point, the thrust sleeve spring 1015 can push the taper sleeve 1014 and the guide nut 1013 to move to the right by its own spring force, and the guide nut 1013 drives the adjusting shaft to move to the right by means of trapezoidal threads thereon, so that the adjusting shaft extends out of the brake cylinder 1 to start working. Before the brake disc comes into contact with the brake pad (even when the disc just fits to the brake pad, the adjusting shaft continues to extend out of the brake cylinder 1, and at this point the external lever firstly has a certain deformation, with a deformation force that can be overcome by adjustment of the spring force, and the taper sleeve 1014 and the guide nut 1013 are still pushed until deformation of the external levers stops when the braking force of the brake caliper is reached; at this point, the spring force of the thrust sleeve is far smaller than the braking force), since the brake cylinder 1 just requires a small force for pushing the external lever to move, the thrust sleeve spring 1015 is sufficient to push the taper sleeve 1014 and the guide nut 1013 to move. When the guide nut 1013 drives the adjusting shaft to move to the right by means of the trapezoidal threads thereon, the adjusting shaft drives the gap adjusting nut 1019 fixedly mounted on the adjusting shaft to move to the right, and the gap adjusting nut 1019 in turn drives the gap adjusting sleeve 1018 and the release gap adjusting unit 1017 on the gap adjusting sleeve 1018 to move to the right by means of the gap adjusting spring 1021. When the gap adjusting nut 1019 brings the release gap adjusting unit 1017 into contact with an internal boss 1024 of the cylinder block 101, the gap adjusting nut 1019 continues to move to the right while the gap adjusting sleeve 1018 stays still, making the gap adjusting nut 1019 compress the gap adjusting spring 1021 and disengage from the gap adjusting sleeve 1018, thereby starting to trigger the gap adjustment function. The gap between the release gap adjusting unit 1017 and the internal boss 1024 of the cylinder block 101 is a preset release gap. In the event that the disc gap is larger than the release gap, a gap adjusting mechanism of the brake caliper unit is triggered to ensure a constant disc gap. The specific measure for achieving the gap adjustment by the gap adjusting mechanism (gap adjusting nut assembly) is as follows: when the gap between the brake disc and the brake pad is larger than a preset gap value (release gap), the adjusting shaft continues to be pushed out under the movement of the piston 103; at this point, the pin provided between the gap adjusting nut assembly and the cylinder block 101 bears against the cylinder block 101, so that the taper sleeve 1014 cannot move with the adjusting shaft screw; in addition, the gap adjusting nut 1019 is connected with the adjusting shaft via trapezoidal threads; accordingly, the gap adjusting nut 1019 compresses the gap adjusting spring 1021 to move along with the adjusting shaft; at this point, the gap adjusting nut 1019, disengaged from the taper sleeve 1014, is rotatable around the adjusting shaft screw in a circumferential direction, thereby achieving gap adjustment. In addition, when the external resistance to the brake cylinder 1 is increased, that is, when the brake disc abuts against the brake pad, the spring force of the thrust sleeve spring 1015 itself cannot push the guide nut 1013 to move as the resistance increases, and the brake cylinder 1 cannot continue to extend out. At this point, the thrust sleeve 1023 pushes the inner gasket 1025 to the right to abut with a part in the front (the taper sleeve 1014). The thrust sleeve 1023 and the taper sleeve 1014 work together so that the gasket 1025 presses tightly against the front end of the taper sleeve 1014, and with the friction force generated by the pressing, the gasket 1025 is not rotatable. In addition, two bosses inside the gasket 1025 are embedded into the holes inside the gap adjusting nut 1019 to restrain the gap adjusting nut 1019 from rotation. In this way, when the external resistance to the brake cylinder 1 is large enough (i.e., the resistance to the deformation of the external lever is much larger than the thrust required before the contact of the disc), triggering of the gap adjustment of the gap adjustment mechanism of the brake caliper unit is restrained, thus ensuring a constant disc gap.

When the brake cylinder 1 stops working (released), the compressed gas in the cylinder block 101 is discharged, and the piston 103 is driven by the restoring force of the piston return spring 106 to move to the left until it returns to its original position; meanwhile the thrust sleeve 1023 is driven by the restoring force of the thrust sleeve spring 1015 to return to its original position. Since the thrust sleeve 1023 is threadingly connected to the piston tube cover 1010, the piston tube cover 1010 is simultaneously moved to the left, and the guide nut 1013 is driven to move to the left by the guide spring 1012. At this point, the guide nut 1013 is in an engaged state with the taper sleeve 1014. The guide nut 1013, with trapezoidal threads, drives the adjusting shaft to move to the left, and finally the adjusting shaft, with the trapezoidal threads thereon, drives the gap adjusting nut assembly to return to the original position. The returning process would not be ended if the gap adjustment has been made. In this case, the guide nut 1013 is rotated by means of the disengagement of the guide nut 1013 from the taper sleeve 1014 to counteract the amount of wear of the disc, i.e., the distance of the gap adjustment. The final gap adjustment is achieved by the relative distance of the guide nut 1013 and the gap adjusting nut 1019 on the adjusting shaft (screw).

Embodiment 4

The rail vehicle of the present embodiment includes the brake caliper unit according to the above embodiment. Please refer to Embodiment 3 for the structure of the brake caliper unit.

The braking system of the rail vehicle of the present disclosure is of stable working performance, and the brake caliper unit thereof can not only recognize excessive elastic deformation of the external lever, but also can avoid the gap adjustment triggered by the excessive elastic deformation of the external lever.

In addition to the above-described embodiments, the present disclosure is also subject to other embodiments. Any technical solution obtained by equivalent replacement or equivalent transformation will fall into the scope of protection of the present disclosure.

What is claimed is:

1. A brake cylinder, comprising a cylinder block and a cylinder head fixedly sleeved over one end of the cylinder block, the cylinder block being provided therein with a piston, a guide spring, a guide nut, a taper sleeve, an adjusting shaft assembly and a gap adjusting nut assembly, wherein the gap adjusting nut assembly comprises a gap adjusting nut, a gap adjusting sleeve and a gap adjusting spring, and a groove extending along an axial direction of the gap adjusting sleeve is formed on an outer circumferential surface of the gap adjusting sleeve, in which groove a release gap adjusting unit is provided.

2. The brake cylinder according to claim 1, wherein there is a release gap between the release gap adjusting unit and an internal boss of the cylinder block.

3. The brake cylinder according to claim 1, wherein the cylinder block is further provided therein with a set of internal lever assemblies uniformly arranged along a circumferential direction of the adjusting shaft assembly, one end of each internal lever assembly abutting with a thrust sleeve, and the other end thereof abutting with the piston.

4. The brake cylinder according to claim 3, wherein each internal lever assembly comprises a lever body composed of two brackets and an intermediate portion connecting the two brackets together, each intermediate portion being formed with a transverse through hole in which a middle fulcrum pin passing through the two brackets is inserted, two ends of each middle fulcrum pin on the outside of the two brackets being respectively provided with a needle bearing, first pin holes being respectively provided on one end of the two brackets and fitted to a first pin over which a first bearing is sleeved, and second pin holes being respectively provided on the other end of the two brackets and fitted to a second pin over which a second bearing is sleeved.

5. The brake cylinder according to claim 1, wherein contact surfaces between the taper sleeve and the guide nut form a taper surface fitting, and the taper sleeve is slidably fitted with the guide nut to form a first clutch; the guide nut is connected with one end of the guide spring, the other end of the guide spring is connected with a block provided on the adjusting shaft assembly, and a piston tube cover connected to an inner thread of the thrust sleeve is sleeved over an outer circumferential surface of the block; a thrust sleeve spring is disposed between the thrust sleeve and the taper sleeve, a cylinder head is sleeved over an outer circumferential surface of the thrust sleeve, and a piston return spring is disposed between the cylinder head and the thrust sleeve.

6. The brake cylinder according to claim 5, wherein one end of the thrust sleeve spring abuts with the thrust sleeve, the other end abuts with the taper sleeve, one end of the piston return spring abuts with the thrust sleeve, and the other end abuts with the cylinder head through the piston.

7. The brake cylinder according to claim 1, wherein contact surfaces between the gap adjusting nut and the gap adjusting sleeve form a taper surface fitting, and the gap adjusting nut is slidably fitted with the gap adjusting sleeve to form a second clutch; one end of the gap adjusting spring abuts with the gap adjusting nut, and the other end abuts with a clamp spring fixedly connected to the gap adjusting sleeve.

8. The brake cylinder according to claim 1, wherein a first groove, a second groove, and a third groove are sequentially disposed on the piston from inside to outside in a radial direction thereof, an inner sealing ring is disposed in the first groove, a sealing ring is disposed in the third groove, and the sealing ring and the inner sealing ring seal the piston and the cylinder head.

9. The brake cylinder according to claim 1, wherein a groove hole extending along an axial direction of the thrust sleeve is formed on an outer circumferential surface of the thrust sleeve, in which groove hole a stop screw is disposed.

10. The brake cylinder according to claim 1, wherein the release gap adjusting unit is a pin.

11. The brake cylinder according to claim 10, wherein the release gap adjusting unit is a cylindrical pin.

12. The brake cylinder according to claim 1, wherein the adjusting shaft assembly comprises an adjusting shaft and a yoke fitted at one end of the adjusting shaft, the taper sleeve is sleeved over the adjusting shaft, a rear end portion of the adjusting shaft is partially inserted into a cavity of the cylinder block and a front end is inserted into a shaft hole of the yoke, the adjusting shaft has an external thread, and the adjusting shaft passes through an adjusting shaft hole located in the middle of the cylinder head to abut against a rear cover.

13. The brake cylinder according to claim 12, wherein an extension extending inwardly is provided on upper and lower ends of the yoke, on which extension a bushing is provided.

14. A brake caliper unit, comprising a brake cylinder, a hanger, a brake pad carrier component, an external lever component and a housing component, wherein the brake cylinder is the brake cylinder according to claim 1.

15. The brake caliper unit according to claim 14, wherein the guide nut is connected to one end of the guide spring, the other end of the guide spring is connected with a block, a piston tube cover is disposed on an outer circumferential surface of the block, the piston tube cover is connected to an inner thread of the thrust sleeve, and a thrust sleeve spring is provided between the thrust sleeve and the taper sleeve.

16. The brake caliper unit according to claim 14, wherein contact surfaces between the taper sleeve and the guide nut form a taper surface fitting, the taper sleeve comprises a taper sleeve tube and a projection disposed at a front end of the taper sleeve tube, the projection has an inner taper hole, and the guide nut comprises a guide nut tube and a projection block disposed at a rear end of the guide nut tube; the projection block having an outer taper surface that can abut against the inner taper hole of the projection, and the guide nut is slidably fitted with the taper sleeve to form a first clutch; the thrust sleeve comprises a thrust sleeve tube and inner and outer flanges disposed at a rear end of the thrust sleeve tube, one end of the thrust sleeve spring abuts with the inner flange of the thrust sleeve, and the other end abuts with the projection of the taper sleeve; a cylinder head is sleeved over an outer circumferential surface of the thrust sleeve, and a piston return spring is disposed between the cylinder head and the thrust sleeve, wherein one end of the piston return spring abuts with the outer flange of the thrust sleeve, and the other end abuts with the cylinder head through the piston.

17. The brake caliper unit according to claim 14, wherein the gap adjusting nut comprises a gap adjusting nut tube and a protrusion block disposed at a rear end of the gap adjusting nut tube, the protrusion block has an outer taper surface with a first taper tooth, and the gap adjusting sleeve comprises a gap adjusting sleeve tube and a protrusion disposed at a rear end of the gap adjusting sleeve tube; the protrusion has an inner taper hole, a side wall of the inner taper hole has a second taper tooth cooperating with the first taper tooth, the outer taper surface of the protrusion block is able to cooperating with the inner taper hole of the protrusion, and the gap adjusting nut is slidably fitted with the gap adjusting sleeve to form a second clutch; the gap adjusting spring is sleeved over the gap adjusting nut tube, with one end thereof abutting with the protrusion block of the gap adjusting nut, and the other end abutting with a clamp spring fixedly connected to the gap adjusting sleeve.

18. The brake caliper unit according to claim 14, wherein the adjusting shaft assembly comprises an adjusting shaft and a yoke fitted at one end of the adjusting shaft, the taper sleeve is sleeved over the adjusting shaft, a rear end portion of the adjusting shaft is partially inserted into a cavity of the cylinder block, and a front end is inserted into a shaft hole of the yoke; the adjusting shaft has an external thread, the adjusting shaft passes through an adjusting shaft hole located in the middle of the cylinder head to abut against a rear cover, and an extension extending inwardly is disposed on upper and lower ends of the yoke, the extension being provided with a bushing.

19. The brake caliper unit according to claim 14, wherein the hanger, formed in a rectangular shape, has four corners each provided with a wing block protruding outwardly, each wing block is provided with a bolt hole cooperating with a hanging bolt, wherein the hanger is fixedly connected to a vehicle bogie through the hanging bolt, and a rectangular block extending vertically downward is arranged on both sides of a lower end of the hanger; the housing component is composed of upper and lower housings, wherein the upper housing is cylindrical and fastened between the two rectangular blocks, and connecting bolts passing through the rectangular block are provided at two ports of the cylindrical upper housing; the lower housing has a rectangular parallelepiped shape, a curved block is provided on both sides of the lower housing, and the curved blocks are connected to the external lever component via a connecting pin.

20. The brake caliper unit according to claim 19, wherein the external lever component comprises a body in a ladder shape and arranged in a lateral direction, wherein an intermediate portion of the body has a square hole groove fitted in cooperation with each curved block, the body has a first concave frame at one end and a second concave frame at the other end, upper and lower arms of the first concave frame are respectively connected to the brake cylinder by a threaded pin, and upper and lower arms of the second concave frame are respectively connected to the brake pad carrier component through a support pin.

21. The brake caliper unit according to claim 20, wherein the brake pad carrier component comprises a brake pad carrier, a support pin, a split pin, a spring, a brake pad carrier stop-sleeve, an elastic pin, a brake pad carrier stop-block and a torsion spring, wherein the brake pad carrier is provided thereon with a brake pad, an upper portion of the brake pad carrier is provided with an upper pin mounting seat fitted with the upper arm of the second concave frame, the upper pin mounting seat is provided with an upper pin hole fitted with the upper support pin, a lower end of the upper support pin is formed with a split pin hole cooperating with the split pin, and a lower portion of the brake pad carrier is provided with a lower pin mounting seat fitted with the lower arm of the second concave frame; the lower pin mounting seat is provided with a lower pin hole fitted with the lower support pin, a lower end of the lower support pin is installed with the brake pad carrier stop-sleeve, and the brake pad carrier stop-sleeve is provided with an elastic pin for fixing the lower support pin; the spring is sleeved over the lower support pin above the brake pad carrier stop-sleeve, a brake pad carrier stop-block is provided at the brake pad carrier stop-sleeve on the brake pad carrier, and the brake pad carrier is connected with the brake pad carrier stop-block via the torsion spring.

22. A rail vehicle, comprising the brake caliper unit according to claim 14.

* * * * *